United States Patent Office 3,235,002
Patented Feb. 15, 1966

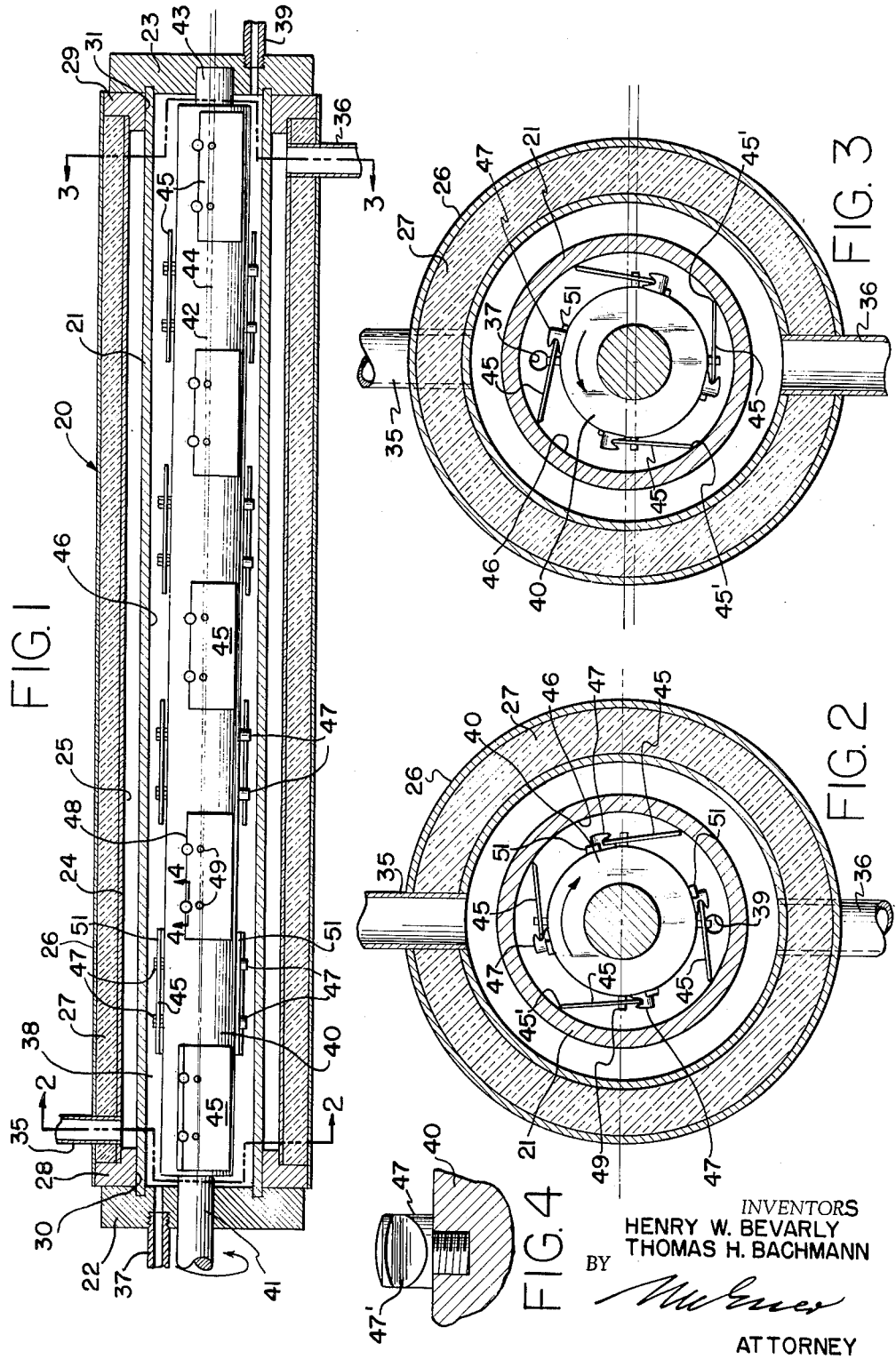

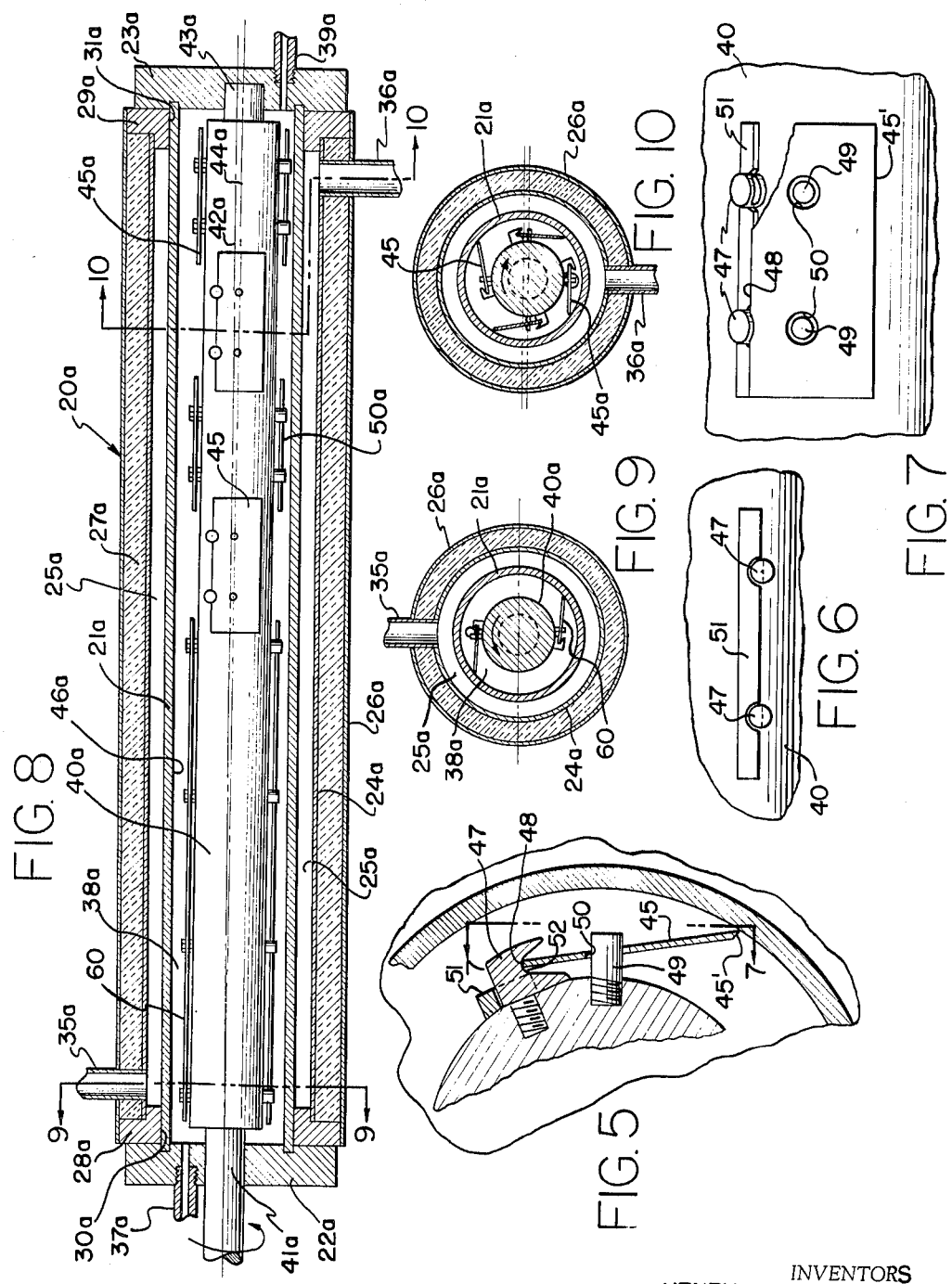

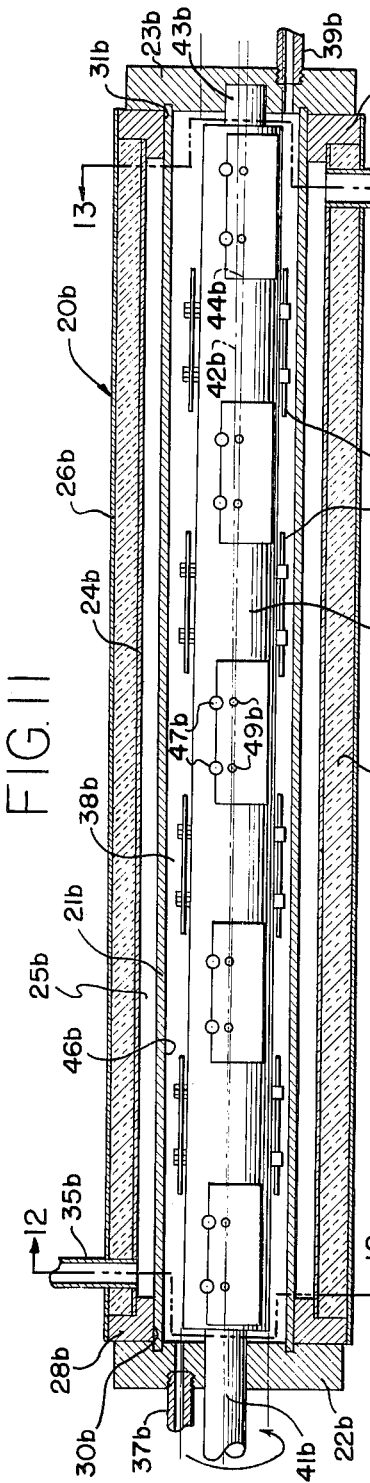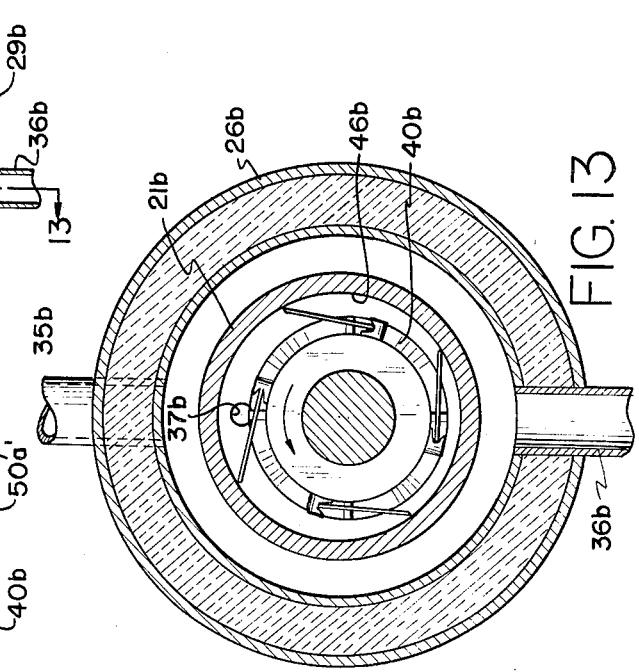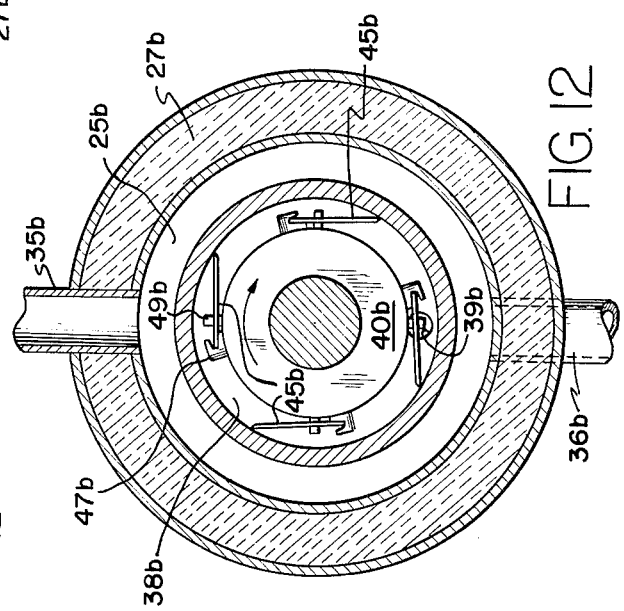

3,235,002
HEAT EXCHANGE APPARATUS
Henry W. Bevarly, Louisville, Ky., and Thomas H. Bachmann, New Albany, Ind., assignors to Chemetron Corporation, Chicago, Ill., a corporation of Delaware
Filed Nov. 7, 1963, Ser. No. 322,169
7 Claims. (Cl. 165—94)

This invention relates in general to a heat exchange apparatus and in particular to a scraped surface heat exchange apparatus provided with a heat transfer tube in which scraper blades are rotatably mounted on a shaft.

Scraped surface heat exchange apparatus provided with a scraper blade carrying shaft mounted concentrically within a tube or cylinder have been used for many years. In such apparatus, the blades generally are held in scraping contact with the inner surface of the heat transfer tube by the resistance of the materials being processed, hereafter called material resistance, and by centrifugal force. Scraping contact, even with materials of relatively low viscosities, is achieved through these two forces at sufficiently high shaft speeds. Such apparatus, when used for processing more viscous, adhesive or semi-plastic materials, have certain disadvantages, among which are relatively high power consumption for rotating the shaft and a tendency of the material to rotate as a mass known as "mass rotation" resulting in reduced heat transfer and mixing efficiency.

It has been found that when the scraper blade carrying shaft is mounted eccentrically with respect to the axis of the tube, various advantages are achieved, as disclosed in United States Patent No. 3,019,110. These advantages include a kneading effect imparted to the material being processed caused by oscillation of the blades, intense mixing which improves the overall heat transfer efficiency, elimination of "mass rotation" of the materials being processed, continuous splitting of the materials being processed when the blades are staggered, and lower shaft speed which results in relatively low power requirements for driving the shaft.

However, in a scraped surface heat exchange apparatus provided with an eccentrically mounted shaft, greater material resistance is required to hold the blades in scraping contact with the inner surface of the heat exchanger tube at corresponding shaft speeds; therefore, the materials are ordinarily brought from relatively low viscosities to sufficiently high viscosities, by any suitable means for example a scraped surface heat exchange apparatus having a concentrically mounted shaft, to afford sufficient material resistance before they are introduced into the heat exchange apparatus having an eccentrically mounted shaft, as is obvious to one skilled in the art.

It is the primary purpose of the invention to provide a scraped surface heat exchange apparatus which is capable of changing the viscosities of materials from relatively low initial viscosities to relatively high viscosities or degrees of plasticity, or vice versa, by rotatably mounting the shaft to effect progressively increasing oscillation of the scraper blades longitudinally of the tube.

It is a feature of the invention to provide a scraped surface heat exchange apparatus having a scraper blade carrying shaft mounted to effect progressively increasing oscillation of the scraper blades longitudinally of the tube. This is preferably accomplished by mounting one end of the shaft substantially concentrically and by mounting the other end of the shaft eccentrically with respect to axis of the tube.

It is another feature of the invention to provide a scraped surface heat exchange apparatus wherein one or more relatively long blades extend for substantial distances from the concentrically mounted end of the shaft toward the eccentrically mounted end of the shaft. The material resistance is progressively greater from the concentrically mounted end to the eccentrically mounted end due to increased viscosity of the materials being processed. These relatively long blades reach along the inside of the tube far enough to be held in scraping contact with the inner surface of the tube by the higher viscosity materials, even at relatively low shaft speeds.

It is another feature of the invention to provide a scraped surface heat exchange apparatus having a scraper blade carrying shaft mounted to effect substantially no oscillation of the blades at one end of the shaft and to effect progressively increasing oscillation of the blades toward the other end of the shaft, wherein the shaft has a taper converging toward the other end of the shaft.

In the diagrammatic, illustrative drawings:

FIGURE 1 is a front elevational view, mainly in cross section, showing a heat exchange apparatus in accordance with one embodiment of the invention;

FIGURE 2 is an enlarged cross-sectional view taken along line 2—2 of FIGURE 1;

FIGURE 3 is an enlarged cross-sectional view taken along line 3—3 of FIGURE 1;

FIGURE 4 is a view of a mounting member taken generally along line 4—4 of FIGURE 1;

FIGURE 5 is an enlarged fragmentary view showing a portion of the heat exchange apparatus;

FIGURE 6 is a fragmentary view showing a back-up bar and two associated blade mounting pins arranged on a shaft;

FIGURE 7 is a fragmentary view taken along line 7—7 of FIGURE 5;

FIGURE 8 is a front elevational view, mainly in cross section, of another embodiment of the heat exchange apparatus of the invention;

FIGURE 9 is a cross-sectional view taken along line 9—9 of FIGURE 8;

FIGURE 10 is a cross-sectional view taken along line 10—10 of FIGURE 8;

FIGURE 11 is an elevational view, mainly in cross section, of another embodiment of the heat exchange apparatus of the invention;

FIGURE 12 is a cross-sectional view taken along line 12—12 of FIGURE 11; and

FIGURE 13 is a cross-sectional view taken along line 13—13 of FIGURE 11.

Referring now to the embodiment of FIGURES 1 through 7 of the illustrative drawings, there is shown a heat exchange apparatus generally indicated at 20. The heat exchange apparatus 20 includes a generally cylindrical heat exchange tube 21 which is shown to be closed at its ends by end plates 22 and 23. Although the tube 21 is preferably a right circular cylinder for ease and economy of manufacture, it is to be understood that the tube 21 can have other shapes, for example a slightly frusto-conical shape. The tube 21 is jacketed by a tube or cylinder 24 which is shown to be spaced outwardly and concentrically around the tube 21 to provide a chamber 25 through which a heat transfer medium is capable of being circulated. Spaced outwardly and concentrically around the tube or cylinder 24 is an outer tube or cover 26. Suitable insulation material 27 is shown to be provided throughout the annular space between the tubes 24 and 26. Opposed annular flanges or collars 28 and 29 are preferably secured for example by welding to the ends of the tube 24. Annular openings 30 and 31 in the respective collars 28 and 29 are shown to receive the opposed ends of the tube 21. The tube 21 may be either welded or removably secured to the flanges 28 and 29, and the end plates 22 and 23 are removably secured to the flanges 28 and 29 and the ends of the tube 21, respectively. Shaft seals (not shown) are preferably employed. Conduits 35 and 36 are shown to provide communication with opposed ends of the chamber 25. A suitable heat exchange medium can be passed through the conduit 35 and along the chamber 25 and discharged through the conduit 36, or vice versa. A conduit 37 is shown to be connected to the end plate 22 to provide communication with one end of a chamber 38 defined by the tube 21, and a conduit 39 is shown to be connected to the opposed end plate 23 to provide communication with the other end of the chamber 38. Although one construction for effecting heat transfer has been disclosed, any suitable construction for passing a heat exchange medium into heat exchange relationship with the tube 21 can be provided.

A shaft 40 is shown to be rotatably mounted at one stub end 41 and through end plate 22 substantially concentrically with respect to longitudinal axis 42 of the tube 21, while an opposite stub end 43 of the shaft 40 is mounted eccentrically with respect to the tube axis 42 by end plate 23. Shaft axis 44 is accordingly substantially aligned with the tube axis 42 at one end and is spaced from the tube axis 42 at the other end. The shaft 40 is shown to movably mount a plurality of scraper blades 45 which are held in contact with the inner surface 46 of the tube 21 by material resistance and centrifugal force as the shaft 40 rotates. The shaft 40 is suitably driven at its stub end 41 at various speeds by a motor (not shown). The blades 45 are shown to be arranged in staggered and overlapping sets so that one set of blades is disposed in overlapping and staggered relationship with respect to the next adjacent set of blades. Although each set of blades 45 is shown to have two blades, any suitable number of blades can be provided. Each blade 45 is shown to be movably mounted on the shaft 40 by two threadably secured, spaced mounting members 47. The mounting members 47 each have a radiused recess 47' for nesting one side 48 of the co-operating blade 45 to permit oscillating movement of the blade 45. The other side of each blade 45 is provided with a scraping edge 45' for scraping the inner surface 46 of the tube 21. The shaft 40 is shown to be provided with threadably secured locking pins 49 which pass through enlarged apertures 50 in the blades 45. The mounting members 47 and the pins 49 permit the scraping edges 45' of the blades 45 to establish and maintain scraping contact along their length with the inner surface 46 of the tube 21.

Behind each blade 45 toward only the concentrically mounted end of the shaft 40 is a back-up bar 51 secured for example by welding to the shaft 40. A restriction 52 is defined by each back-up bar 51 and the side 48 of the co-operating blade 45. The restriction 52 prevents substantially all the flowable materials which act upon the underside of each substantially non-oscillating blade from flowing between the shaft 40 and the side 48 of the co-operating blade 45 and yet enables sufficient material flow between the shaft 40 and the side 48 of each co-operating blade 45 to permit any blade movement. The restriction 52 prevents accumulation or packing of materials at the side 48 of the blade 45 which would serve to freeze the blades at the concentric end against movement.

In considering the operation of the heat exchange apparatus 20 shown in FIGURES 1 through 7 of the drawings, assume that a heat exchange medium for example a coolant is continuously being passed through the conduit 35 into the chamber 25, circulated through the chamber 25, and discharged through the conduit 36 and assume further that materials having relatively low viscosities are continuously being passed through the conduit 37 into the chamber 38 for continuous processing and are continuously being discharged through the conduit 39 and that the shaft 40 is being rotated at an appropriate speed. The sets of blades 45 near the concentrically mounted end are held in scraping contact with the inner surface 46 of the tube 21, even though the materials at this general location have relatively low viscosities. Springs (not shown) can be provided to assist in holding the blades 45 in scraping contact with the inner surface 46, although springs are neither preferred nor necessary. As the materials are being processed, that is, cooled and mixed, and as they pass from the concentrically mounted end of the shaft 40 toward the eccentrically mounted end of the shaft 40, the materials progressively increase in viscosity and thereby material resistance. The shaft speed is adjusted so that the material resistance and centrifugal force are sufficient to hold blades 45 in scraping contact with the inner surface 46.

Since the viscosities of some materials increase upon heating, a heating medium instead of a cooling medium can be circulated through the chamber 25.

As the materials progress from the concentrically mounted end toward the eccentrically mounted end, the kneading effect to which the materials are subjected is progressively increased and consequently the mixing and the heat transfer efficiency are progressively increased.

Assuming that the heat exchange apparatus 20 is to be used to change the viscosities of materials from high viscosities to low viscosities, the heat exchange medium can be a heating medium which is introduced through the conduit 35 into and along the chamber 25 and discharged through the conduit 36, or vice versa. In this event, the highly viscous materials are introduced through the conduit 39 and passed into and along the chamber 38 and are eventually discharged through the conduit 37.

The conduits 35 and 36 and the conduits 37 and 39 can serve either as inlets or outlets.

In the embodiments of FIGURES 8 through 10 of the illustrative drawings, the same reference characters are employed to designate components having the same construction and function as in the embodiment of FIGURES 1 through 7, with the addition of letter "*a*." The embodiment of FIGURES 8 through 10 differs from the embodiment of FIGURES 1 through 7 only in the respect that one set of blades 60 reach along the inside of a tube 21*a* for a sufficient extent from the concentrically mounted end 41*a* so that the blades 60 are held in scraping contact with the inner surface 46*a* of the tube 21*a*, even at relatively low shaft speeds, by the higher viscosity materials resulting after passage through a portion of the heat transfer tube. Also no back-up bars are provided. It is preferred to provide a set of two blades 60 extending for about one-half the extent of the shaft 40*a*, although one or any other suitable number of blades of suitable length can be provided.

Referring now to the embodiment of FIGURES 11 through 13 of the illustrative drawings, the same reference characters are employed to designate those components having the same construction and function as in the embodiment of FIGURES 1 through 7, with the addition of letter "*b*." The embodiment of FIGURES 11 through 13 differs from the embodiment of FIGURES 1 through 7 in that a shaft 40*b* of a heat exchange apparatus 20*b* is shown to have a taper along its entire operative length, with the taper being convergent toward the eccentrically mounted end of the shaft 40*b* and in that no back-up bars are provided. Tapering of the shaft 40*b* permits a larger shaft diameter at the concentrically mounted end where no blade oscillation is required and a smaller shaft diameter toward the eccentrically mounted end where blade oscillation is required. The cross-sectional area between the shaft 40*b* and the inner surface 46*b* of the tube 21*b* changes in a longitudinal direction, and in particular the cross-sectional area between the shaft 40*b* and the tube 21*b* progressively increases from the one end to the other end along the shaft 40*b*.

It will be readily apparent to those skilled in the art that the shaft 40*b* of the heat exchange apparatus 20*b* can be provided with relatively long scraper blades as provided for the heat exchange apparatus 20*a*, and also that the cross-sectional shape of the tube 21, 21*a*, and 21b and/or the shafts 40, 40a, and 40b can be constructed to impart a progressively increasing oscillating movement to scraper blades arranged along the blade carrying shaft.

By way of example but not limitation, the shaft 40 has an outside diameter of 2⅞ inches and a length of 46 inches between its stub ends 41 and 43. The tube axis 42 and the shaft axis 44 intersect at the place the stub end 41 is journalled in the end plate 22 and the tube axis 42 is spaced from the shaft axis 44 by 5/32 of an inch at the place the stub end 43 is journalled in the end plate 23; the heat exchange tube 21 has an inside diameter of 4 inches; the restriction 52 is only about a few thousandths of an inch in width.

It is preferred that the shaft 40 be disposed such that the ratio of distances measured from the shaft 40 at its eccentric end to the inner surface 46 of the tube 21 in the zone of maximum distance is at least about 1.5 times the distance in the zone of minimum distance. It is also preferred to have the maximum ratio of the maximum shaft-to-inner surface distance to the minimum shaft-to-inner surface distance be less than about 5 to 1.

Other embodiments and modifications of this invention will suggest themselves to those skilled in the art and all such of these as come within the spirit of this invention are included within its scope as best defined by the appended claims.

What is claimed is:

1. In a heat exchange apparatus: a tube, means for passing a heat exchange medium into heat exchange relationship with said tube, inlet and outlet means disposed at opposed ends of said tube for introducing and discharging flowable materials, a shaft rotatable within said tube, a plurality of scraper blades movably mounted on said shaft for scraping contact with the inner surface of said tube, and means mounting said shaft for effecting substantially no oscillation of the blades at one end of said shaft and for effecting progressively increasing oscillation of the blades toward the other end of said shaft when said shaft rotates.

2. In a heat exchange apparatus: a generally cylindrical tube having a longitudinal axis, means for passing a heat exchange medium into heat exchange relationship with said tube, inlet and outlet means disposed at opposed ends of said tube for introducing and discharging flowable materials, a shaft rotatable within said tube, a plurality of scraper blades movably mounted on said shaft for scraping the inner surface of said tube, means for mounting said shaft at one end of said tube substantially concentrically with respect to said tube axis, and means for mounting said shaft at the other end of said tube eccentrically with respect to said tube axis.

3. In a heat exchange apparatus: a generally cylindrical tube having a longitudinal axis, means for passing a heat exchange medium into heat exchange relationship with said tube, inlet and outlet means disposed at opposed ends of said tube for introducing and discharging flowable materials, a shaft rotatable within said tube, a plurality of scrapers blades movably mounted on said shaft in a staggered and overlapping relationship and adapted to scrape the inner surface of said tube, means for mounting said shaft at one end of said tube substantially concentrically with respect to said tube axis, and means for mounting said shaft at the other end of said tube eccentrically with respect to said tube axis.

4. In a heat exchange apparatus: a generally cylindrical tube having a longitudinal axis, means for passing a heat exchange medium into heat exchange relationship with said tube, inlet and outlet means disposed at opposed ends of said tube for introducing and discharging flowable materials, a tapered shaft rotatable within said tube, a plurality of scraper blades movably mounted on said shaft for scraping the inner surface of said tube, means for mounting said shaft at one end of said tube substantially concentrically with respect to said tube axis, and means for mounting said shaft at the other end of said tube eccentrically with respect to said tube axis, said tapered shaft converging toward its eccentrically mounted end.

5. In a heat exchange apparatus: a generally cylindrical tube having a longitudinal axis, means for passing a heat exchange medium into heat exchange relationship with said tube, inlet and outlet means disposed at opposed ends of said tube for introducing and discharging flowable materials, a shaft rotatable within said tube, a plurality of sets of scraper blades movably mounted in a staggered and overlapping relationship, means for mounting said shaft at one end of said tube substantially concentrically with respect to said tube axis, and means for mounting said shaft at the other end of said tube eccentrically with respect to said tube axis, the materials in the tube being progressively more viscous from said concentrically mounted end on said eccentrically mounted end so that the material resistance increases at progressively greater distances from said concentrically mounted end, one of said sets of blades extending along said shaft for a sufficient distance from said concentrically mounted end to enable material resistance to hold said one set of blades in scraping contact with the inner surface of said tube.

6. In a heat exchange apparatus: a generally cylindrical tube having a longitudinal axis, means for passing a heat exchange medium into heat exchange relationship with said tube, inlet and outlet means disposed at opposed ends of said tube for introducing and discharging flowable materials, a plurality of scraper blades for scraping the inner surface of said tube, and means rotatably mounting said scraper blades relative to said tube for progressively increasing oscillation of said scraper blades longitudinally of said tube.

7. In a heat exchange apparatus: a generally cylindrical tube having a longitudinal axis, means for passing a heat exchange medium into heat exchange relationship with said tube, inlet and outlet means disposed at opposed ends of said tube for introducing and discharging flowable materials, a plurality of scraper blades for scraping the inner surface of said tube, and means rotatably mounting said scraper blades relative to said tube for progressively increasing oscillation of said scraper blades longitudinally of said tube, the cross-sectional area between said shaft and said tube changing in a longitudinal direction.

References Cited by the Examiner

UNITED STATES PATENTS

| | | | |
|---|---|---|---|
| 1,162,368 | 11/1915 | Jones | 165—94 |
| 1,376,016 | 4/1921 | Howell | 165—94 |
| 2,211,387 | 8/1940 | Routh | 259—9 X |
| 2,526,367 | 10/1950 | Kaltenbach et al. | 259—134 |
| 2,955,026 | 10/1960 | Hollings et al. | 23—290 X |

FREDERICK L. MATTESON, JR., *Primary Examiner.*